United States Patent
Hsiao

(10) Patent No.: US 8,271,721 B2
(45) Date of Patent: Sep. 18, 2012

(54) DATA WRITING METHOD AND DATA STORAGE DEVICE

(75) Inventor: Wei-Yi Hsiao, Kaohsiung (TW)

(73) Assignee: Silicon Motion, Inc., Jhubei, Hsinchu County (TW)

( * ) Notice: Subject to any disclaimer, the term of this patent is extended or adjusted under 35 U.S.C. 154(b) by 306 days.

(21) Appl. No.: 12/783,661

(22) Filed: May 20, 2010

(65) Prior Publication Data

US 2011/0153918 A1    Jun. 23, 2011

(30) Foreign Application Priority Data

Dec. 23, 2009    (TW) ............................... 98144422 A

(51) Int. Cl.
*G06F 12/02* (2006.01)
(52) U.S. Cl. ........................................ 711/103; 711/165
(58) Field of Classification Search .................. 711/103, 711/165
See application file for complete search history.

(56) References Cited

U.S. PATENT DOCUMENTS

| 5,930,167 A * | 7/1999 | Lee et al. ................. 365/185.03 |
| 2008/0307164 A1* | 12/2008 | Sinclair ......................... 711/135 |
| 2011/0029719 A1* | 2/2011 | Yeh ............................... 711/103 |

OTHER PUBLICATIONS

Chang et al., Real-Time Garbage Collection for Flash-Memory Storage Systems of Real-Time Embedded Systems, Nov. 2004 ,ACM, ACM transactions on Embedded Computing Systems, vol. 3, No. 4., pp. 837-863.*

* cited by examiner

*Primary Examiner* — Jared Rutz
(74) *Attorney, Agent, or Firm* — Thomas|Kayden

(57) ABSTRACT

The invention provides a data writing method for a flash memory. First, a write command, a write address, and write data are received from a host. When a total number of block pairs in the flash memory is equal to a threshold value, and execution of the write command increases the total number of block pairs, the write data is written to a data buffer block of the flash memory, and the write address is stored in an address storage table. A target block pair comprising a target mother block and a target child block is then selected from the block pairs for integration. The target mother block and the target child block are integrated into an integrated block during receiving intervals of a plurality of subsequent write commands. Finally, the write command is executed according to the write data stored in the data buffer block and the write address stored in the address storage table.

17 Claims, 12 Drawing Sheets

DATA WRITING METHOD AND DATA STORAGE DEVICE

CROSS REFERENCE TO RELATED APPLICATIONS

This application claims priority of Taiwan Patent Application No. 98144422, filed on Dec. 23, 2009, the entirety of which is incorporated by reference herein.

BACKGROUND OF THE INVENTION

1. Field of the Invention

The invention relates to memories, and more particularly to flash memories.

2. Description of the Related Art

Referring to FIG. 1, a schematic diagram of transmission timings of a write command from a host to a data storage device is shown. Assume that the data storage device comprises a flash memory for data storage. When a host wants to write data to the data storage device, the host first sends a first portion write command with an identifier 0x80 to the data storage device. The host then sequentially sends column address and row address to the data storage device to indicate the address for storing data. The host then transmits the data to be stored in the data storage device, and then sends a second portion write command with an identifier 0x10 to the data storage device. After transmission of the second portion write command is completed, a voltage of a ready/busy line coupled between the host and the data storage device is lowered by the data storage device, thereby preventing the host from sending subsequent write commands or data. According to a protocol specification, a processing time period $T_{prog}$ for lowering the voltage of the ready/busy line cannot be longer than 250 ms. During the processing time period $T_{prog}$, the data storage device writes the received data to a flash memory according to the row address and the column address. After data writing is completed, the data storage device then raises the voltage of the ready/busy line, so that the host can then send a read status command to the data storage device to inquire about the execution status of a previous write command.

A flash memory comprises a plurality of blocks, and each block comprises a plurality of pages for data storage. A page can be programmed to store data. When a page has stored data, the page cannot be written to again. After data of a block comprising the page is erased, the page can be programmed again to store data again. When a data storage device executes a write command, if a page with an address corresponding to the write command has already stored original data, the data storage device cannot directly write updated data to the page. Instead, the data storage device would write the updated data to a page of a spare block, and then build a mapping relationship between the spare block and a block containing the page storing the original data. The block containing the page storing the original data is referred to as a mother block, the spare block storing the updated data is referred to as a child block, and the mother block and the child block correspond to the same logical address are referred to as a block pair.

Ordinarily, to maintain a block pair, a controller must record information of the block pair. When a total number of block pairs in a flash memory increases, data amount of the recorded information also increases. To reduce memory space occupied by the recorded information of the block pairs, the controller must keep the total number of block pairs lower then a threshold value. Ordinarily, a data storage device can write received data of a write command to a flash memory during the processing time period $T_{prog}$. When a new block pair is needed to be built due to execution of a write command, in efforts to keep the total number of block pairs constant, the controller must integrate a block pair selected from existing block pairs to reduce the total number of block pairs before the write command is executed.

Because a mother block and a child block of the selected block pair comprise a plurality of pages, integration of the selected block pair requires a long time period, which is longer than the length 250 ms of the interval $T_{prog}$ between the reception of the write command and a subsequent write command. When the flash memory is a multi-level-cell (MLC) flash memory or a triple-level-cell (TLC) flash memory, a mother block and a child block must store great amounts of data; thereby increasing the time period for integrating the mother block and the child block. If integration of the selected block pair cannot be completed during the time interval $T_{prog}$ between reception of the write command and a subsequent write command, error may occur when the write command is executed; thus degrading the performance of the data storage device. A data writing method for solving the aforementioned problem is therefore required.

BRIEF SUMMARY OF THE INVENTION

The invention provides a data writing method for a flash memory. First, a write command, a write address, and write data are received from a host. Whether a total number of block pairs in a flash memory is equal to a threshold value is then determined. Whether execution of the write command increases the total number of block pairs is then determined. When the total number of block pairs is equal to the threshold value, and execution of the write command increases the total number of block pairs, the write data is written to a data buffer block of the flash memory, and the write address is stored in an address storage table. A target block pair for integration is then selected from the block pairs, wherein the target block pair comprises a target mother block and a target child block. When a plurality of subsequent write commands are received from the host, the target mother block and the target child block are integrated into an integrated block during receiving intervals of the subsequent write commands. Finally, the write command is executed according to the write data stored in the data buffer block and the write address stored in the address storage table.

The invention also provides a data storage device. In one embodiment, the data storage device is coupled to a host, and comprises a flash memory and a controller. The flash memory comprises a data buffer block and a plurality of block pairs. The controller receives a write command, a write address, and write data from the host, determines whether a total number of block pairs is equal to a threshold value, determines whether execution of the write command increases the total number of block pairs, writes the write data to the data buffer block and stores the write address in an address storage table when the total number of block pairs is equal to the threshold value and execution of the write command increases the total number of block pairs, selects a target block pair comprising a target mother block and a target child block for integration from the block pairs, integrates the target mother block and the target child block into an integrated block during receiving intervals of a plurality of subsequent write commands when the subsequent write commands are received from the host, and executes the write command according to the write data stored in the data buffer block and the write address stored in the address storage table.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
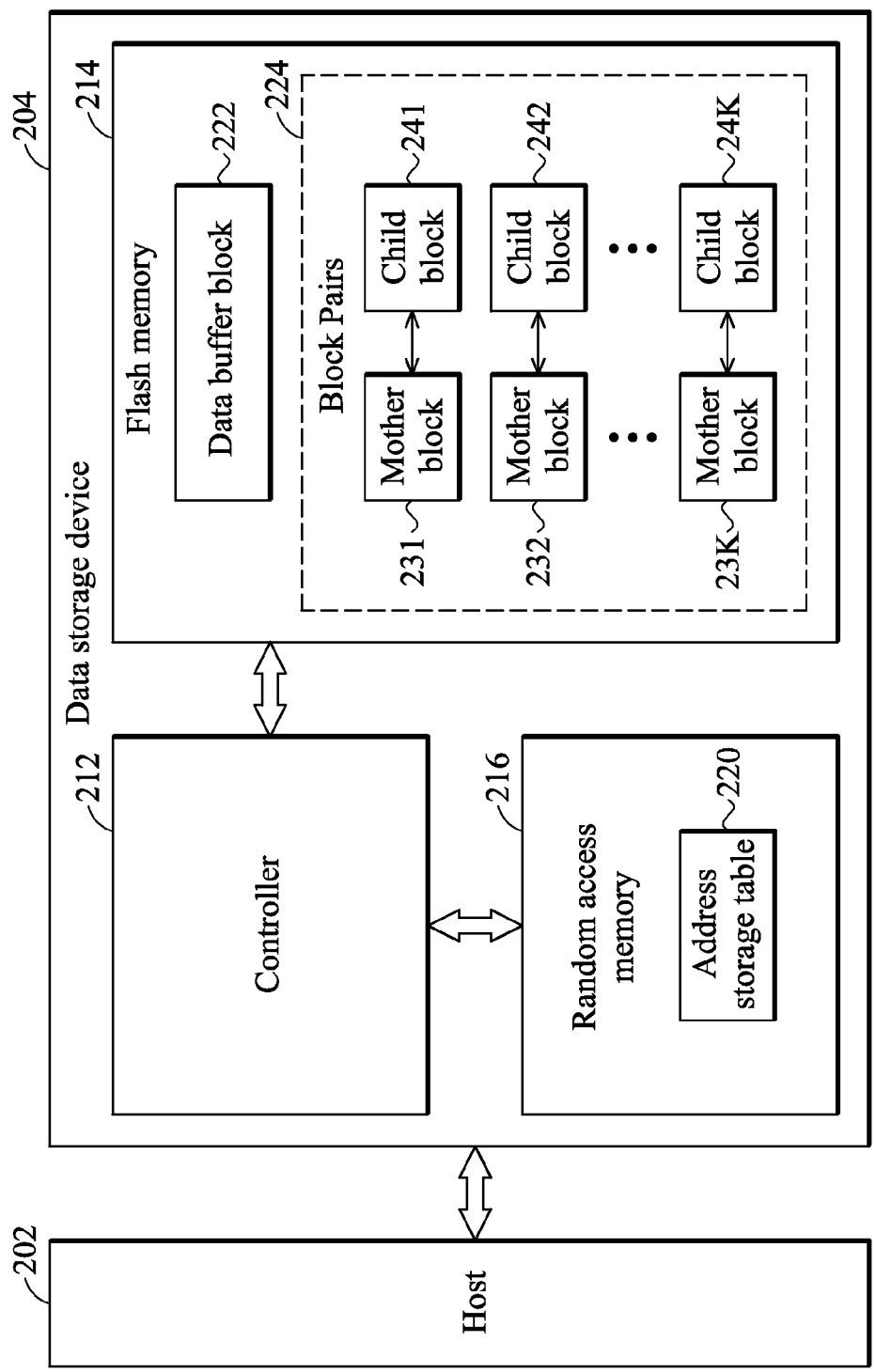
FIG. 2 is a block diagram of a data storage device according to the invention.

Referring to FIG. 2, a block diagram of a data storage device 204 according to the invention is shown. The data storage device 204 is coupled to a host 202, and accesses data according to instructions from the host 202. In one embodiment, the data storage device 204 comprises a controller 212, a flash memory 214, and a random access memory 216. The flash memory 214 comprises a plurality of blocks for data storage and a data buffer block 222. The flash memory 214 further comprises a plurality of block pairs 224. Each block pair comprises a mother block and a child block, the mother block stores original data corresponding to a logical block address, and the child block stores update data corresponding to the logical block address. For example, a block pair comprises a mother block 231 and a child block 241, and another block pair comprises a mother block 23K and a child block 24K. and the random access memory 216 stores an address storage table 220. In one embodiment, the data storage device 204 is a memory card.

The data information about a mapping relationship between original pages of a mother block and update pages of a child block is large and occupies a large memory space of the random access memory 216. To efficiently use the space of the random access memory 216, the controller 212 limits a total number of block pairs 224 to a threshold value N. When the total number K of the block pairs 224 is greater than the threshold value N, the controller 212 selects a target block pair from the block pairs 224, integrates original data stored in a mother block and update data stored in a child block of the target block pair as integrated data, writes the integrated data into an integrated block, and erases data from the mother block and the child block of the target block pair; thereby decreasing the total number of block pairs 224. Thus, the total number K of the block pairs is kept lower or equal to the threshold value N.

When the host 202 sends a write command to the data storage device 204, if the write command requests that an update data be written to a specific page which already has stored original data, because the specific page cannot be written again, the controller 212 therefore must write the update data to an update page of a child block corresponding to a mother block comprising the specific page, and record a mapping relationship between the specific page and the update page. If there is no child block corresponding to the block comprising the specific page, the controller 212 obtains a spare block from the flash memory 214 as a child block corresponding to the mother block comprising the specific page, and records a mapping relationship between the mother block and the child block to create a new block pair.

Figure 1:
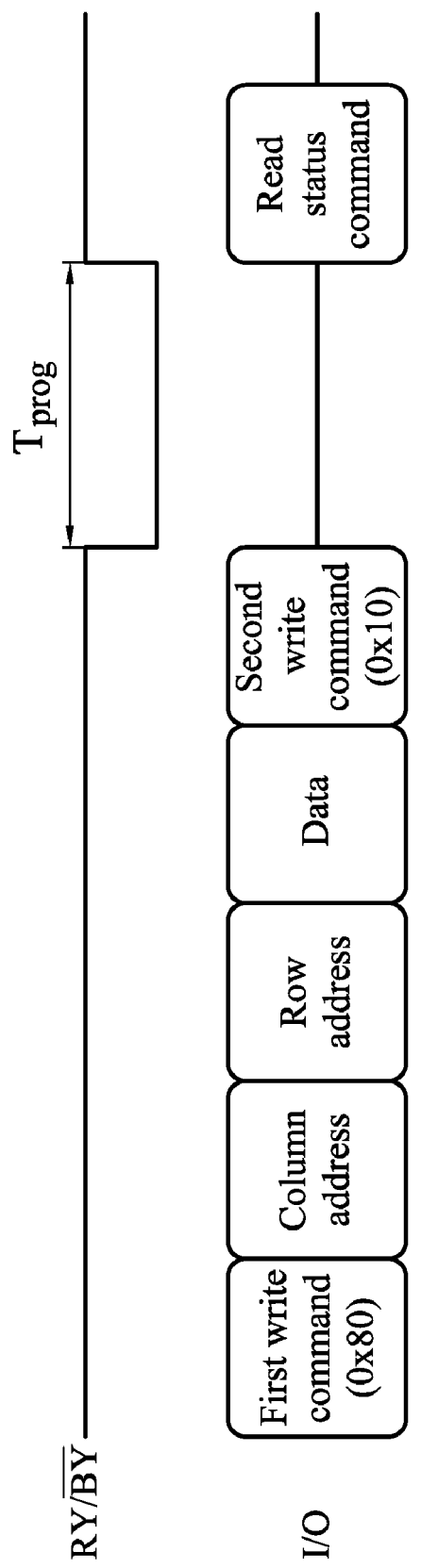
FIG. 1 is a schematic diagram of transmission timings of a write command from a host to a data storage device.

When execution of a write command creates a new block pair, and a total number N of block pairs in a flash memory 214 is equal to a threshold number K, the controller 212 must select a target block pair for integration; thus lowering the total number of block pairs before the new block pair is created. Because a mother block and a child block of the target block pair comprise a great number of pages, integration of the target block pair needs a long time period, which may be greater than the 250 ms time period $T_{prong}$ between transmission of the write command and a subsequent write command, as shown in FIG. 1. The controller 212 therefore divides original data stored in the mother block of the target block pair into a plurality of data segments, and respectively integrates one of the data segments and corresponding update data stored in the child block into integrated data segments during one of the subsequent receiving intervals $T_{prong}$ between the subsequent write commands. In one embodiment, the controller 212 merely divides the original data stored in the mother block into a first data segment and a second data segment, wherein the first data segment comprises data stored in pages with addresses in a former half of the mother block, and the second data segment comprises data stored in pages with addresses in a later half of the mother block. Thus, the controller 212 can complete integration of the target block pair during a few receiving intervals $T_{prong}$ between subsequent write commands, and keep the total number of block pairs in the flash memory 214 constant after the write command is executed.

Figure 3A:
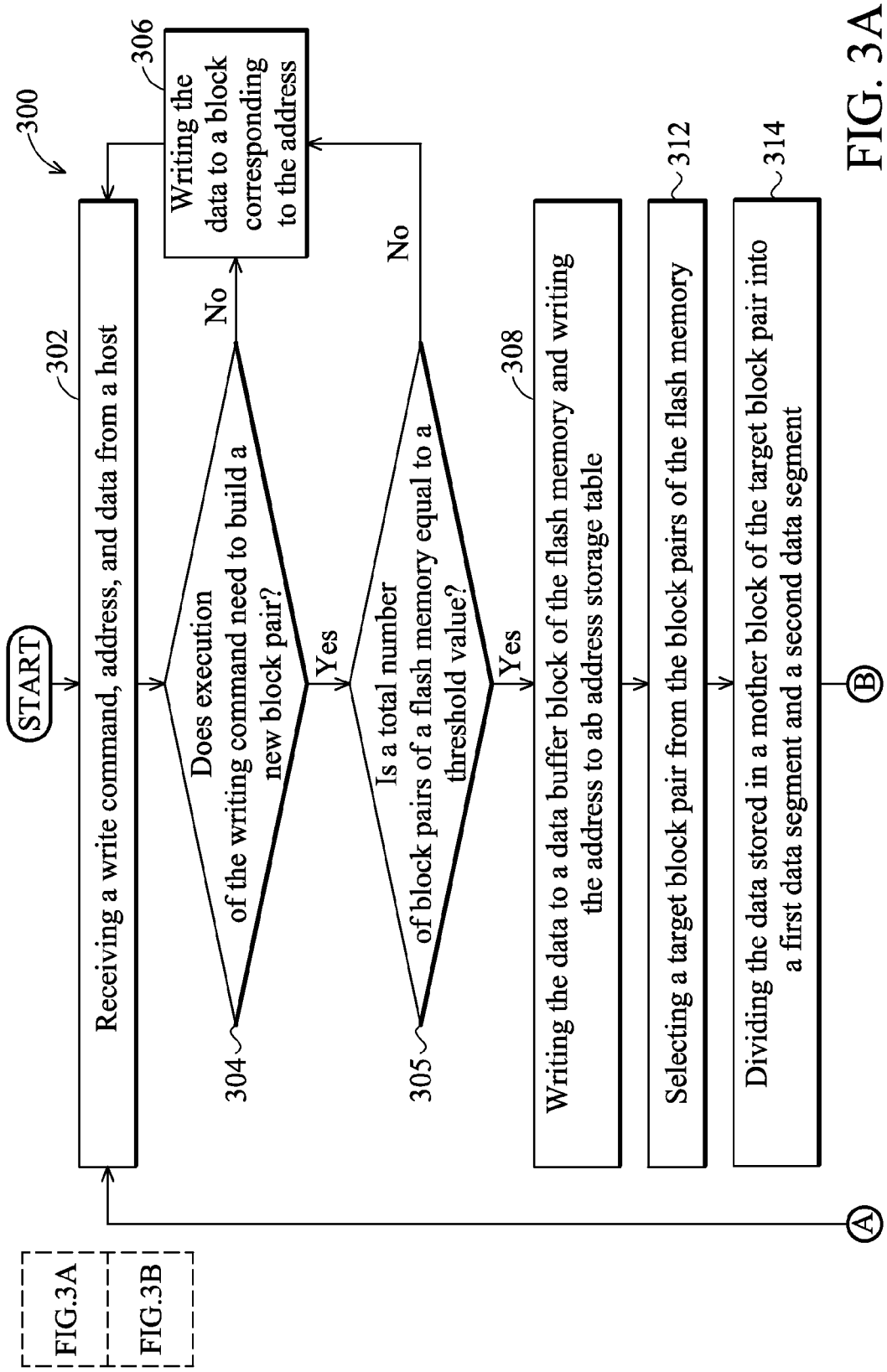
FIG. 3 is a flowchart of a method for executing a write command sent from a host according to the invention.
Figure 3B:
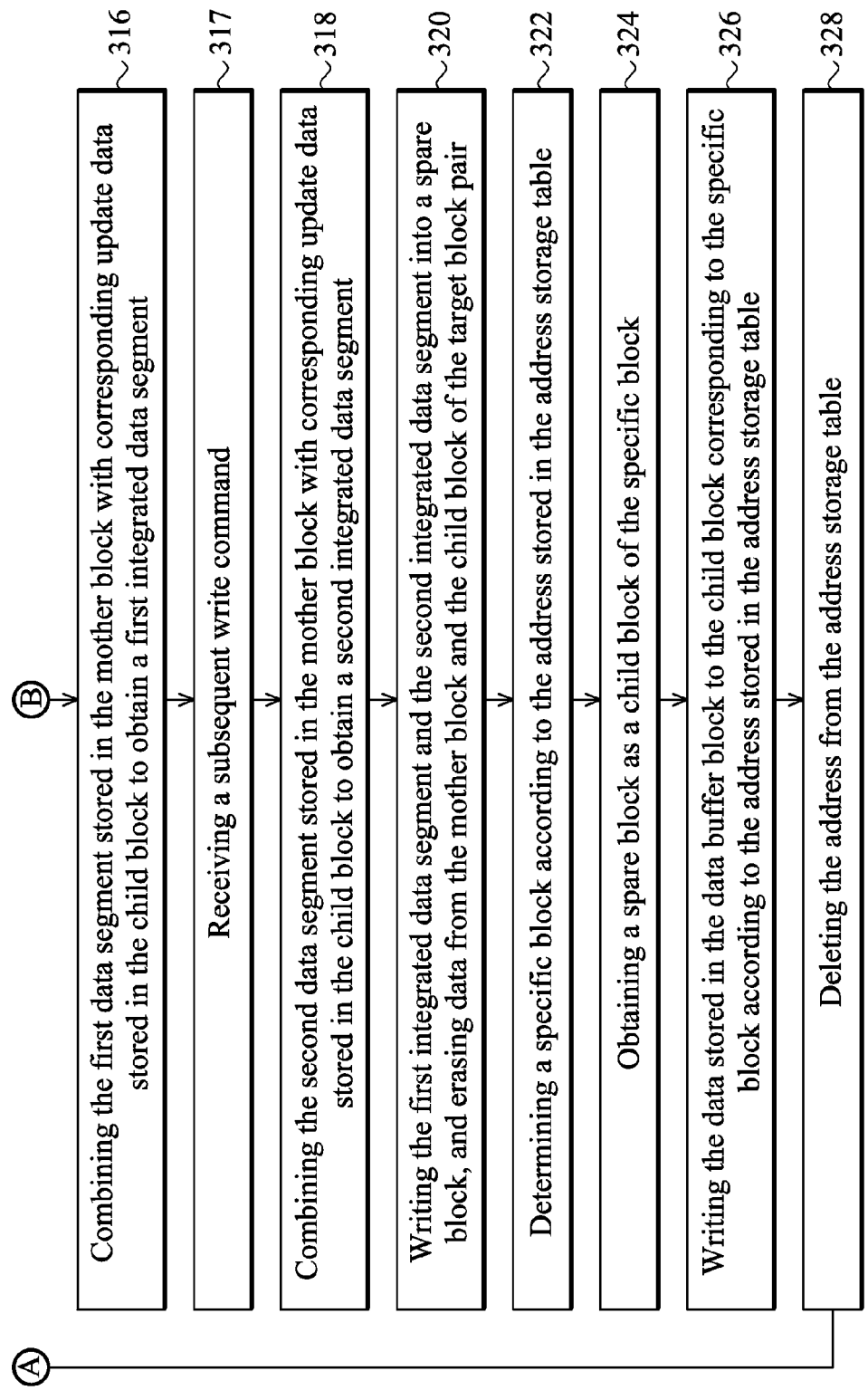

Referring to FIG. 3, a flowchart of a method for executing a write command sent from a host 202 according to the invention is shown. First, the controller 212 receives a write command, address, and data from the host 202 (step 302). The controller 212 then determines whether to create a new block pair for execution of the writing command (step 304). If not, the data is directly written to a block corresponding to the address (step 306). If so, the controller 212 determines whether a total number K of block pairs 224 in a flash memory 214 is equal to a threshold value N (step 305). If not, the data is directly written to a block corresponding to the address (step 306). If so, a total number K of block pairs 224 in a flash memory 214 is equal to a threshold value N, and a new block pair needs to be created for execution of the writing command. The controller 212 therefore must integrate a block pair to reduce the total number K of the block pairs before the write command is executed.

First, the controller 212 writes the data to a data buffer block 222 of the flash memory 214 and writes the address to an address storage table 220 (step 308). The controller 212 then selects a target block pair for integration from the block pairs 224 of the flash memory 214 (step 312). Assume that the selected block pair is the mother block 231 and the child block 241 shown in FIG. 2. The controller 212 then divides the data stored in the mother block 231 of the target block pair into a first data segment and a second data segment (step 314). In one embodiment, the first data segment comprises data stored in the pages with addresses in the former half of the mother block 231, and the second data segment comprises data stored in the pages with addresses in the later half of the mother block 231. The controller 212 then combines the first data segment stored in the mother block 231 with corresponding update data stored in the child block 241 to obtain a first integrated data segment (step 316). Because only data of a former half of the mother block 231 is integrated during a receiving interval $T_{prog}$ between the write command and a subsequent write command, the controller 212 can complete integration of the first data segment during the 250 ms receiving interval $T_{prog}$.

The controller 212 then receives a subsequent write command from the host 202 (step 317). After the subsequent write command is received, the controller 212 has an extra period of 250 ms to be used for integrating the second data segment. First, the controller 212 combines the second data segment stored in the mother block 231 with corresponding update data stored in the child block 241 to obtain a second integrated data segment (step 318). Because only data of a later half of the mother block 231 is integrated during a receiving interval $T_{prog}$ between subsequent write commands, the controller 212 can complete integration of the second data segment during the 250 ms receiving interval $T_{prog}$. The controller 212 then writes the first integrated data segment and the second integrated data segment into a spare block referred to as an integrated block (step 320), and erases data from the mother block 231 and the child block 241 of the target block pair. The controller 212 therefore successfully integrates the mother block 231 and the child block 241 of the target block pair into the integrated block, thus decreasing the total number of block pairs 224 in the flash memory 214 by one.

The controller 212 then executes the write command according to the data stored in the data buffer block 22 and the address stored in the address storage table 220. First, the controller 212 determines a specific block according to the address stored in the address storage table 220 (step 322). The controller 212 then obtains a spare block from the flash memory 214 as a child block of the specific block and builds a mapping relationship between the specific block and the child block (step 324). The controller 212 then reads the data from the data buffer block 222, reads the address from the address storage table 220, and then writes the data to the child block according to the address; thus completing execution of the write command (step 326). Finally, the controller 212 then deletes the address from the address storage table 220 (step 328).

Figure 4:
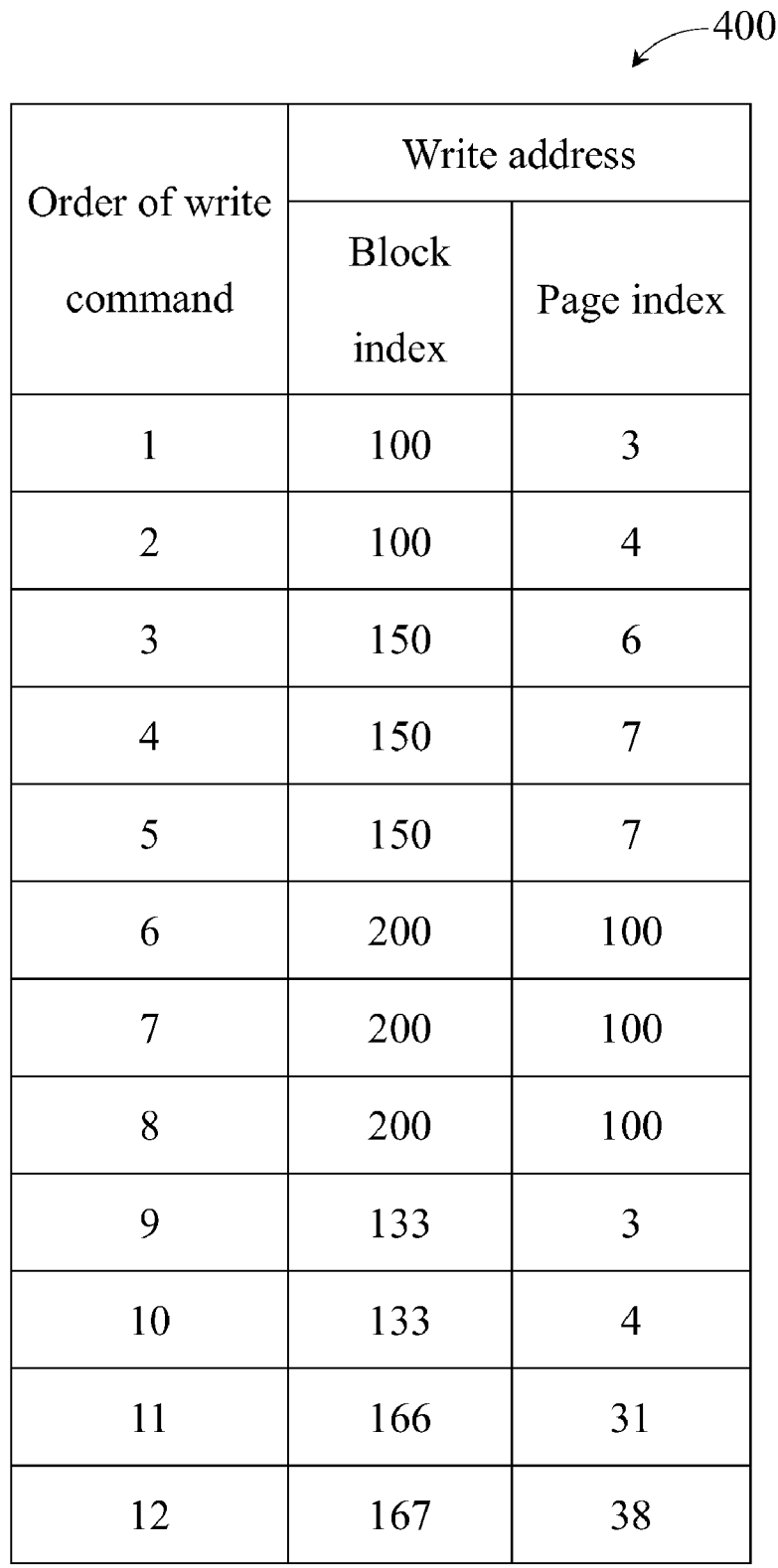
FIG. 4 shows an embodiment of an address storage table according to the invention.

Referring to FIG. 4, an embodiment of an address storage table 400 according to the invention is shown. Assume that the controller 212 sequentially receives 12 write commands from the host 202 and stores the corresponding write addresses into the address storage table 400. The first write command requests that the controller 212 writes the corresponding data to a page 3 of a block 100 of the flash memory 214. The second write command requests that the controller 212 writes the corresponding data to a page 4 of the block 100 of the flash memory 214. The third write command requests that the controller 212 writes the corresponding data to a page 6 of a block 150 of the flash memory 214. The fourth write command requests that the controller 212 writes the corresponding data to a page 7 of the block 150 of the flash memory 214. The fifth write command requests that the controller 212 writes the corresponding data to the page 7 of the block 150 of the flash memory 214.

Figure 5:
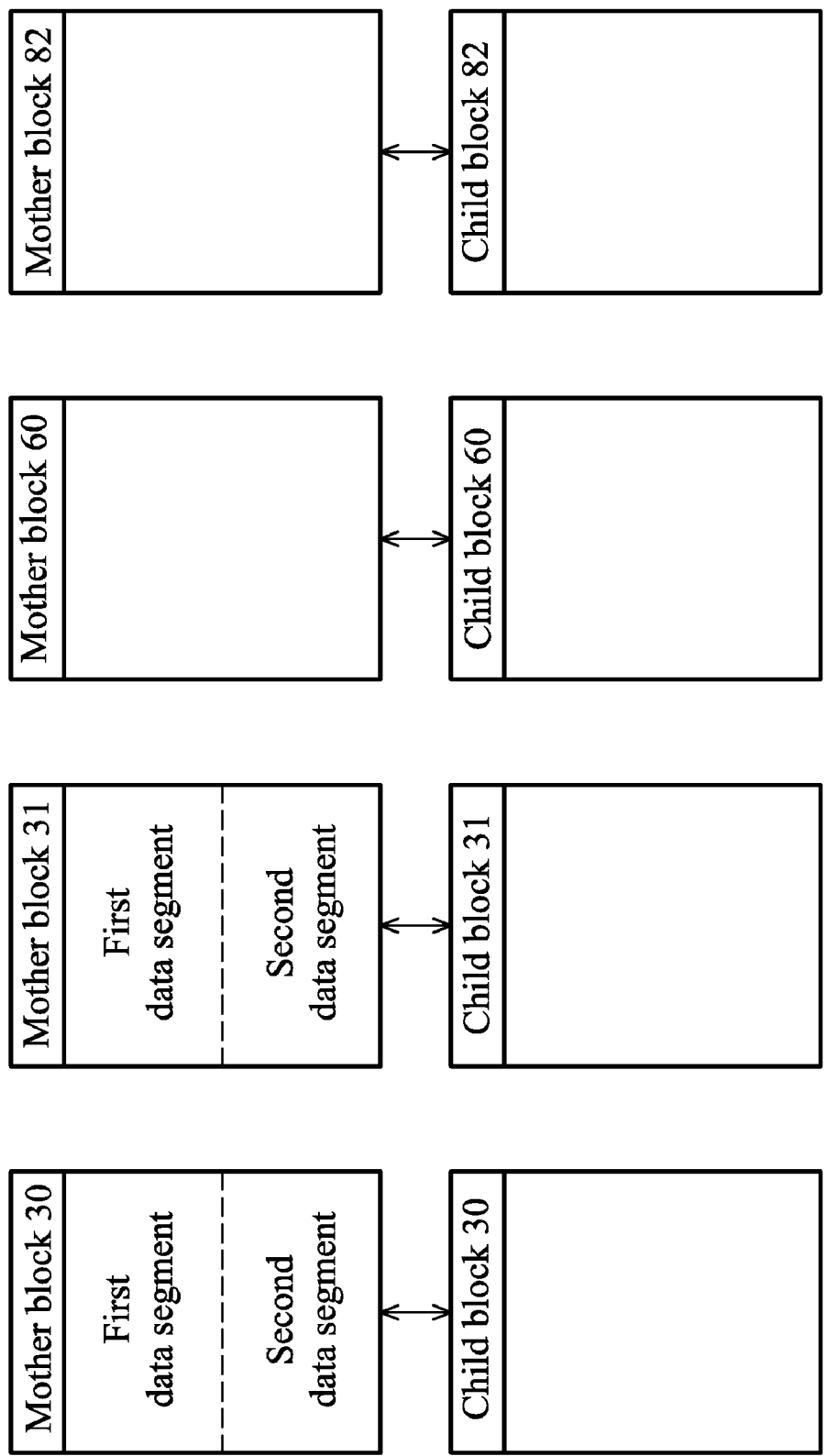
FIG. 5 is a schematic diagram of an embodiment of a plurality of block pairs in a flash memory.

After the controller 212 receives the ninth write command from the host 202, the controller 212 writes the corresponding data into the data buffer block 222, and records the corresponding write address in the address storage table 220. The controller 212 then starts to execute the first write command during a processing time period $T_{prog}$ corresponding to the ninth write command. Assume that a new block pair in the flash memory 214 must be created to execute the first write command. The controller 212 therefore selects a target block pair for integration from the block pairs 224 of the flash memory 214 before the first write command is physically executed; thus keeping a total number of block pairs 224 in the flash memory 214 constant. Referring to FIG. 5, a schematic diagram of an embodiment of a plurality of block pairs in a flash memory 214 is shown. There are four block pairs 30, 31, 60, and 82 in the flash memory 214. The controller 212 selects the block pair 30 as the target block pair for integration. The controller 212 first divides data of a mother block of the block pair 30 into a first data segment and a second data segment, and then combines the first data segment of the mother block of the block pair 30 with corresponding update data stored in the child block of the block pair 30 to obtain a first integrated data segment.

The controller 212 then receives a tenth write command from the host 202, writes the corresponding data into the data buffer block 222, and records the corresponding write address in the address storage table 220. The controller 212 then combines the first data segment of the mother block of the block pair 30 with corresponding update data stored in the child block of the block pair 30 during a processing period $T_{prog}$ corresponding to the tenth write command to obtain a second integrated data segment. The controller 212 then writes the first integrated data segment and the second integrated data segment to a spare block as an integrated block 30, and erases data from the mother block and the child block of the block pair 30. The total number of block pairs is therefore reduced to three.

Figure 6:
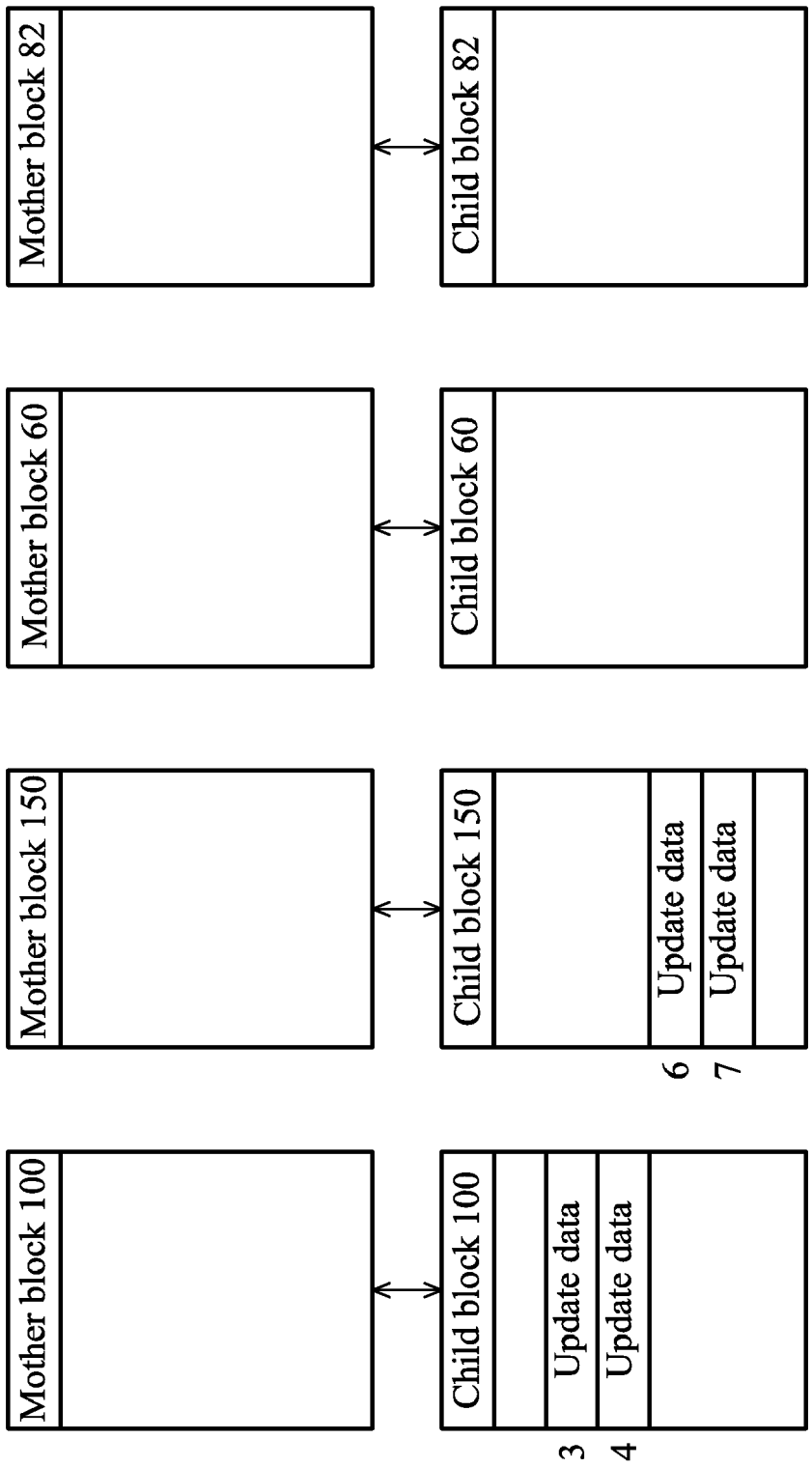
FIG. 6 is a schematic diagram of an embodiment of a subsequent stage of a plurality of block pairs shown in FIG. 5.

The controller 212 then starts to execute the first write command. According to FIG. 4, the first write command requests that the controller 212 writes data to the third page of the block 100, and the second write command requests that the controller 212 writes data to the fourth page of the block 100. Because the first write command and the second write command want to write data to the block 100 at the same time, the controller 212 executes the first write command and the second write command at the same time. First, the controller 212 obtains a spare block as a child block of the block 100; thus creating a new block pair 100. The total number of block pairs in the flash memory is therefore increased to four. The controller 212 then retrieves update data corresponding to the first write command and the second write command from the data buffer block 222, and writes the update data corresponding to the first write command and the second write command into the child block of the block pair 100, as shown in FIG. 6. The controller 212 then erases addresses corresponding to the first write command and the second write command from the address storage table 400.

The controller 212 then receives the eleventh write command from the host 202, writes the corresponding data into the data buffer block 222, and records the corresponding write address in the address storage table 220. The controller 212 then starts to execute the third write command during the start of a processing time period $T_{prog}$ corresponding to the eleventh write command. Assume that a new block pair in the flash memory 214 must be created to execute the third write command. The controller 212 therefore selects a target block pair for integration from the block pairs 224 of the flash memory 214 before the third write command is physically executed; thus keeping the total number of block pairs 224 in the flash memory 214 constant. The controller 212 selects the block pair 31 as the target block pair for integration. The controller 212 first divides data of a mother block of the block pair 31 into a first data segment and a second data segment, and then combines the first data segment of the mother block of the block pair 31 with corresponding update data stored in the child block of the block pair 31 to obtain a first integrated data segment.

The controller 212 then receives a twelfth write command from the host 202, writes the corresponding data into the data buffer block 222, and records the corresponding write address in the address storage table 220. The controller 212 then combines the first data segment of the mother block of the block pair 31 with corresponding update data stored in the child block of the block pair 31 during a processing period $T_{prog}$ corresponding to the twelfth write command to obtain a second integrated data segment. The controller 212 then writes the first integrated data segment and the second integrated data segment to a spare block as an integrated block 31, and erases data from the mother block and the child block of the block pair 31. The total number of block pairs is therefore again reduced to three.

The controller 212 then starts to execute the third write command. According to FIG. 4, the third write command requests that the controller 212 writes data to the sixth page of the block 150, and the fourth write command and the fifth write command request that the controller 212 writes data to the seventh page of the block 150. Because the third write command, the fourth write command, and the fifth write command want to write data to the block 150 at the same time, the controller 212 executes the third write command, the fourth write command, and the fifth write command at the same time. First, the controller 212 obtains a spare block as a child block of the block 150, thus creating a new block pair 150. The total number of block pairs in the flash memory is therefore increased to four. The controller 212 then retrieves update data corresponding to the third write command and the fifth write command from the data buffer block 222, and writes the update data corresponding to the third write command and the fifth write command into the child block of the block pair 150, as shown in FIG. 6. The controller 212 then erases addresses corresponding to the third write command, the fourth write command, and the fifth write command from the address storage table 400.

According to the method 300 shown in FIG. 3, the controller 212 combines a first data segment stored in a mother block with corresponding update data stored in a child block to obtain a first integrated data segment during a first processing period of 250 ms (step 316), combines a second data segment stored in the mother block with corresponding update data stored in the child block to obtain a second integrated data segment during a second processing period of 250 ms (step 318), and then writes the first integrated data segment and the second integrated data segment into a spare block (step 320); thus completing integration of the mother block and the child block of the target block pair. When the first integrated data segment and the second integrated data segment are respectively generated at steps 316 and 318, the first integrated data segment and the second integrated data segment are stored in the random access memory 216 and occupies a memory space. In another embodiment, the controller 212 directly writes the first integrated data segment and the second integrated data segment into a spare block after the first integrated data segment and the second integrated data segment are generated; thereby reducing the memory space occupied by the first integrated data segment and the second integrated data segment.

Figure 7A:
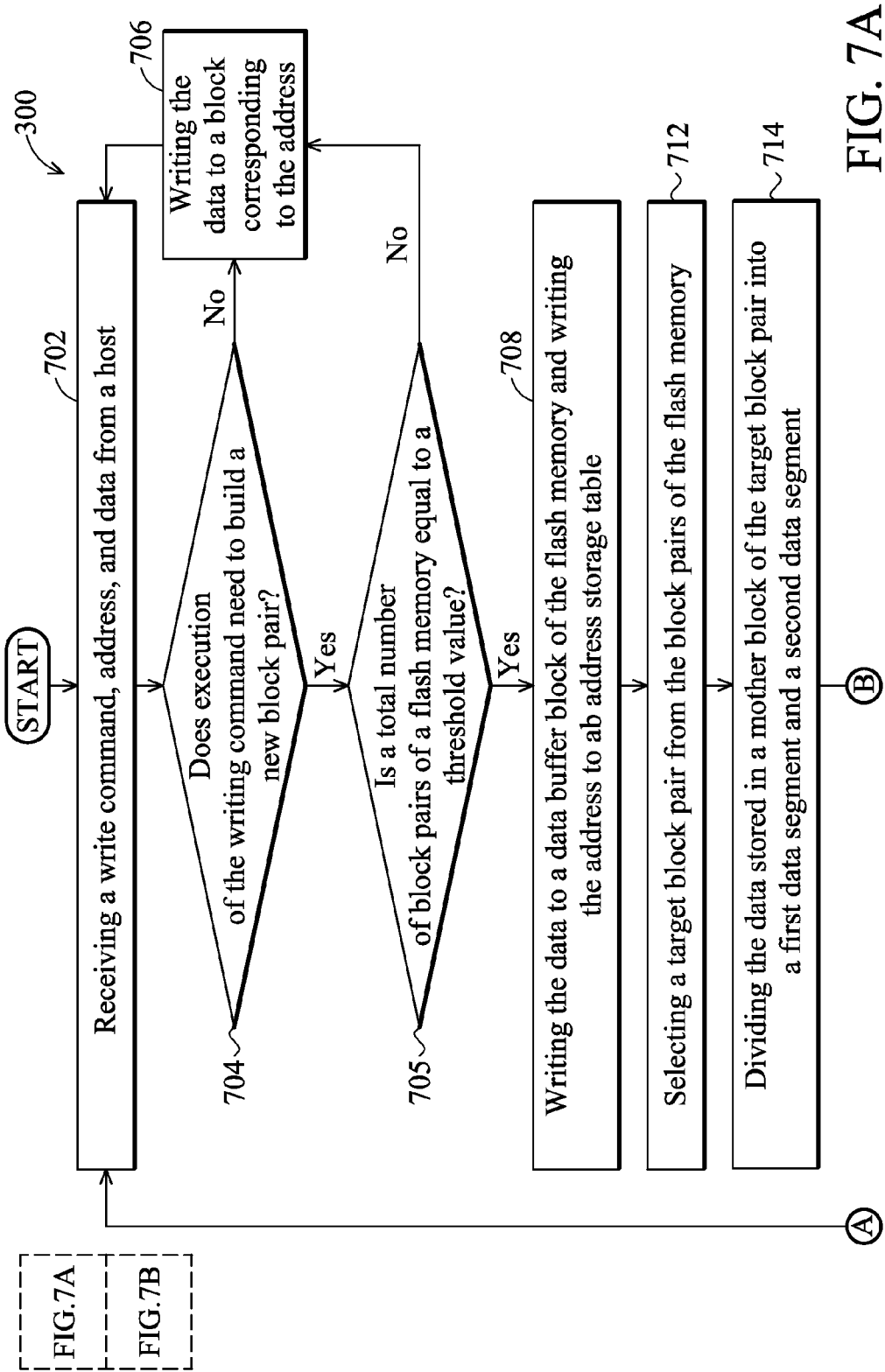
FIG. 7 is a flowchart of another embodiment of a method for executing a write command sent by a host according to the invention.
Figure 7B:
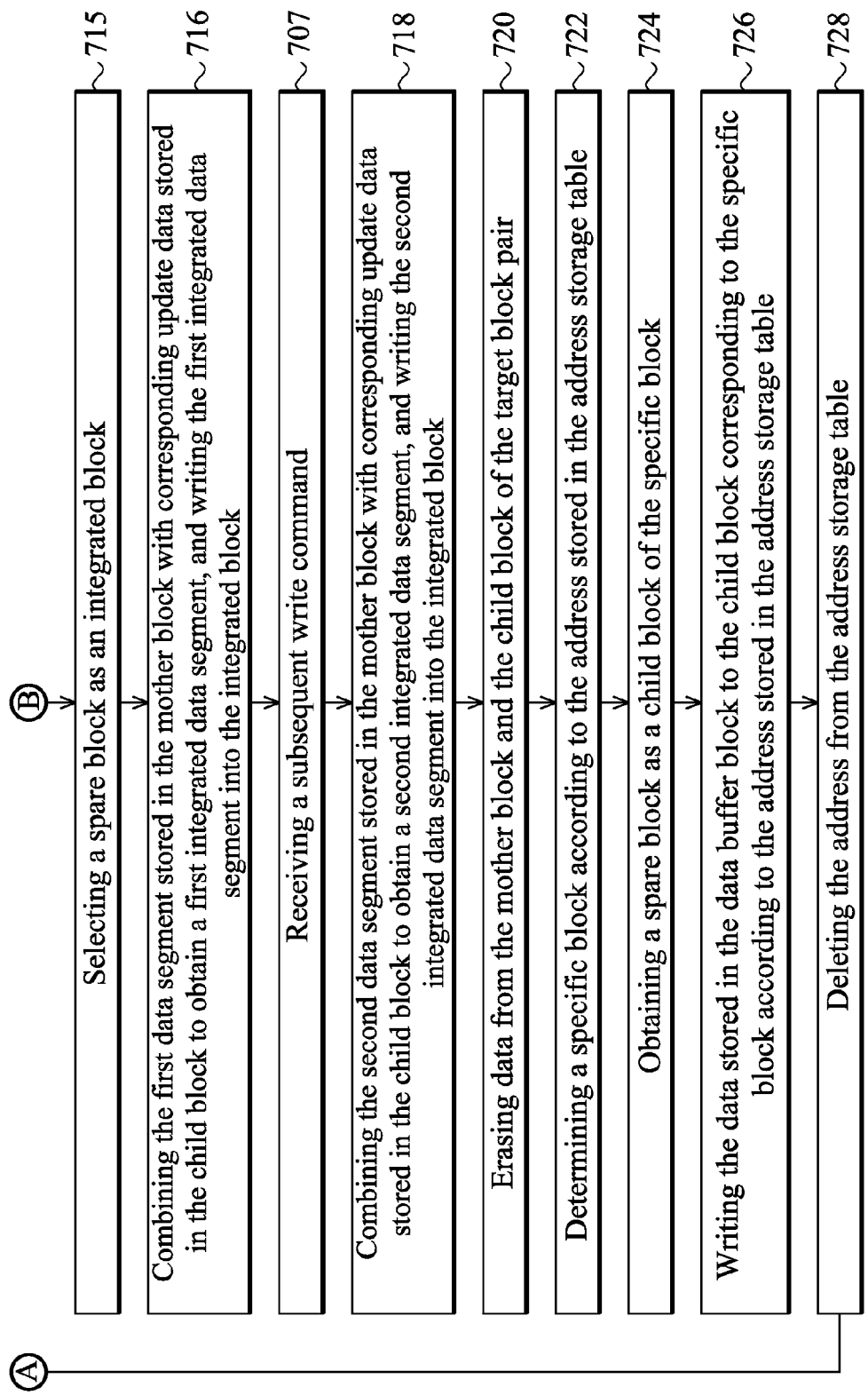

Referring to FIG. 7, a flowchart of another embodiment of a method 700 for executing a write command sent by the host 202 according to the invention is shown. The steps of the method 700 are almost the same as the corresponding steps of the method 300 shown in FIG. 3, except for steps 715, 716, 718, and 720. Only the steps 715, 716, 718, and 720 are therefore explained in the following. At step 715, the controller 212 selects a spare block as an integrated block. The controller 212 then combines a first data segment stored in a mother block of a target block pair with corresponding update data stored in a child block of the target block pair to obtain a first integrated data segment, and directly writes the first integrated data segment into the integrated block (step 716). The controller 212 then receives a subsequent write command (step 717). The controller 212 then combines a second data segment stored in the mother block with corresponding update data stored in the child block to obtain a second integrated data segment, and directly writes the second integrated data segment into the integrated block (step 718). Note that the data stored in the mother block and the child block of the target block pair therefore has been integrated and stored in the integrated block. The controller 212 then erases data from the mother block and the child block of the target block pair (step 720). In comparison with the method 300, the method 700 more efficiently uses the memory space of the random access memory 216.

Figure 8:
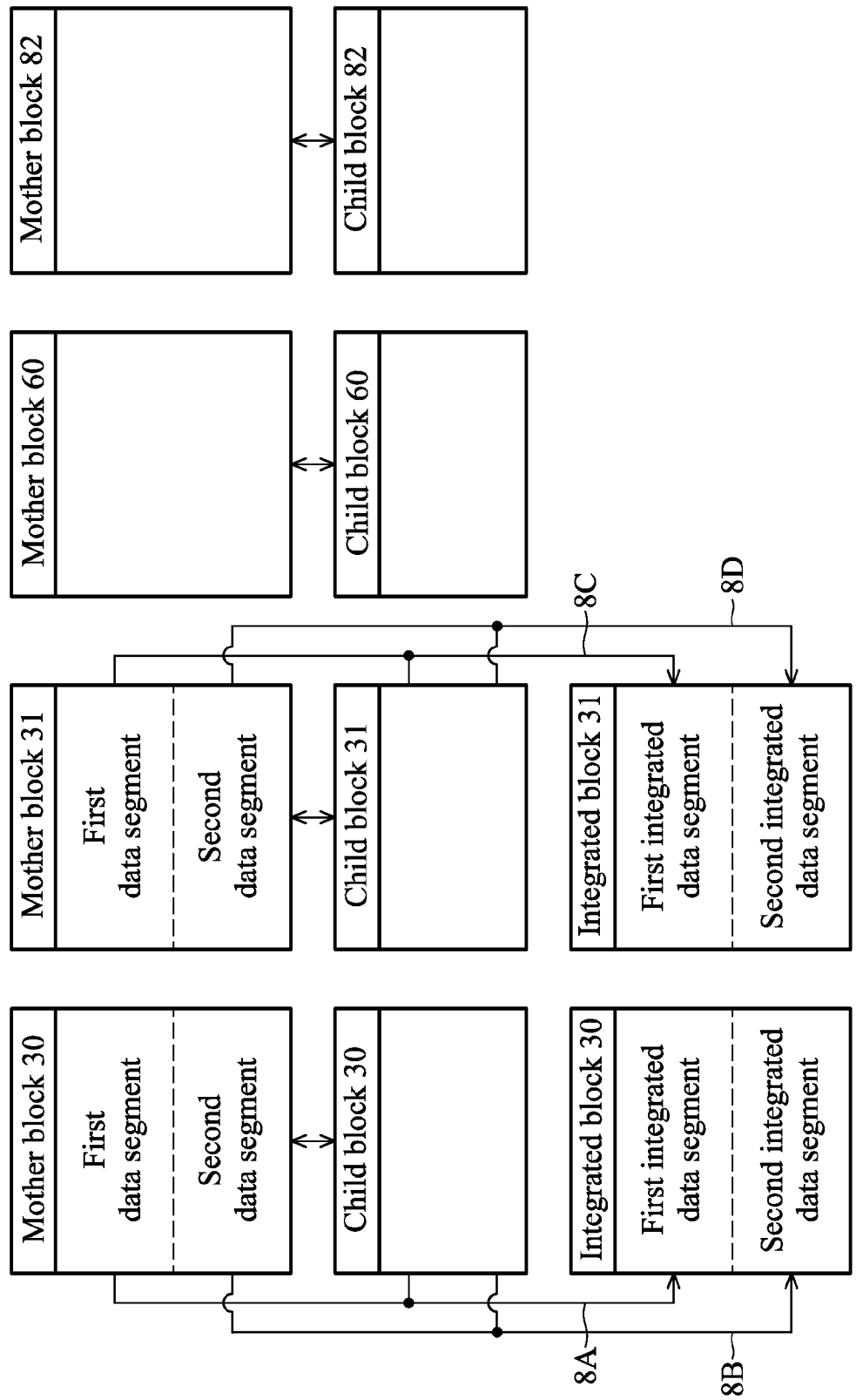
FIG. 8 a schematic diagram of a plurality of block pairs in a flash memory corresponding to the method shown in FIG. 7.

Referring to FIG. 8, a schematic diagram of a plurality of block pairs in a flash memory 214 corresponding to the method 700 is shown. There are four block pairs 30, 31, 60, and 82 in the flash memory 214. The controller 212 selects the block pair 30 as the target block pair for integration. The controller 212 first receives a first write command from the host 202, combines a first data segment stored in a mother block of the target block pair 30 with corresponding update data stored in a child block of the target block pair 30 during a processing time period $T_{prog}$ of the first write command to obtain a first integrated data segment 8A, and directly writes the first integrated data segment 8A to a front half of an integrated block 30. The controller 212 then receives a second write command from the host 202, combines a second data segment stored in a mother block of the target block pair 30 with corresponding update data stored in a child block of the target block pair 30 during a processing time period $T_{prog}$ of the second write command to obtain a second integrated data segment 8B, and directly writes the second integrated data segment 8B to a later half of the integrated block 30. The controller 212 can then erases data from the mother block and the child block of the target block pair 30, thus completing integration of the target block pair 30.

Similarly, the controller 212 then selects a block pair 31 as the target block pair for integration. The controller 212 first receives a third write command from the host 202, combines a first data segment stored in a mother block of the target block pair 31 with corresponding update data stored in a child block of the target block pair 31 during a processing time period $T_{prog}$ of the third write command to obtain a first integrated data segment 8C, and directly writes the first integrated data segment to a front half of an integrated block 31. The controller 212 then receives a fourth write command from the host 202, combines a second data segment stored in a mother block of the target block pair 31 with corresponding update data stored in a child block of the target block pair 31 during a processing time period $T_{prog}$ of the fourth write command to obtain a second integrated data segment 8D, and directly writes the second integrated data segment 8D to a later half of the integrated block 31. As a result, the controller 212 can erase data from the mother block and the child block of the target block pair 31, and complete integration of the target block pair 31.

Figure 9A:
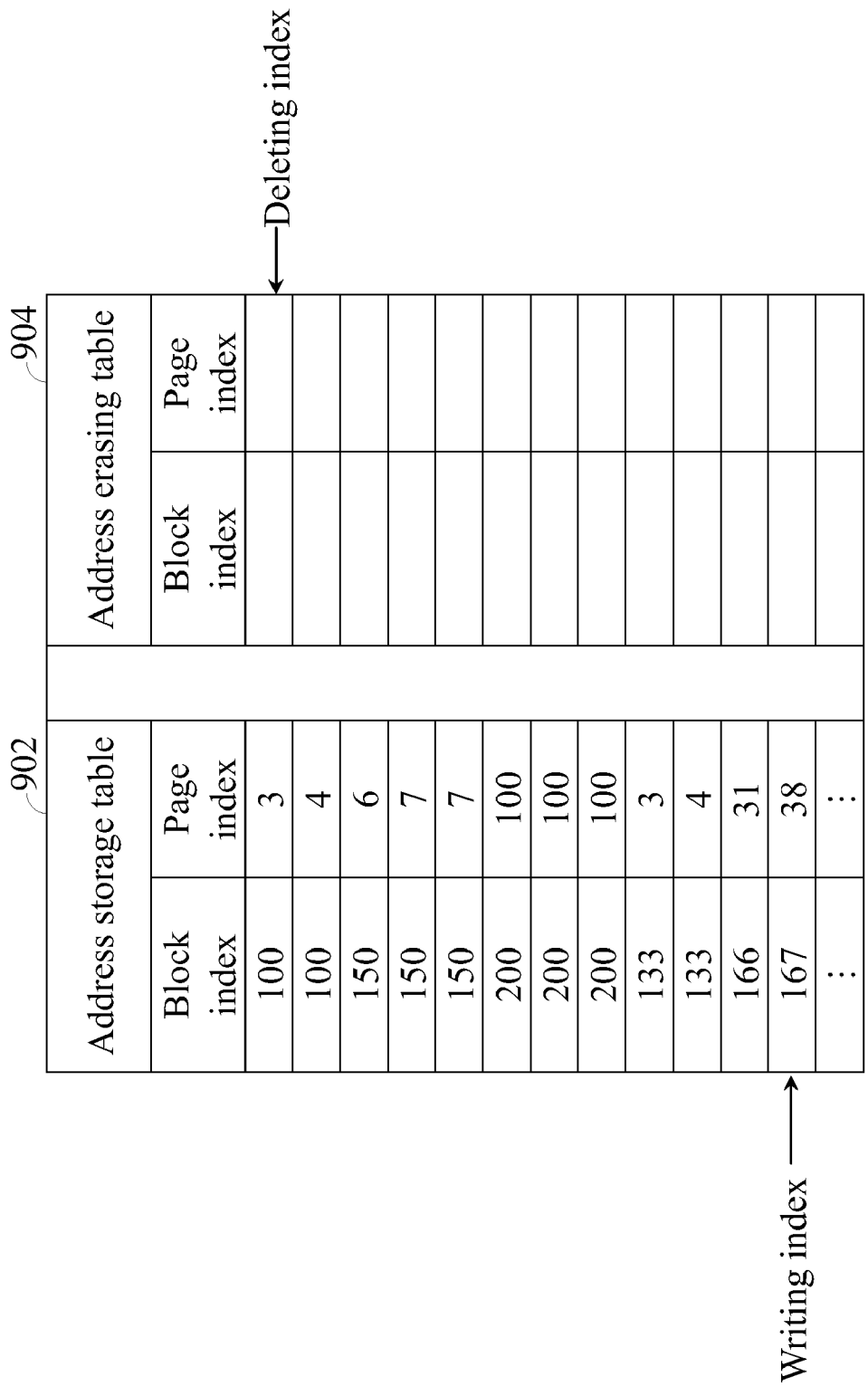
FIG. 9A is a schematic diagram of an embodiment of an address storage table according to the invention.
Figure 9B:
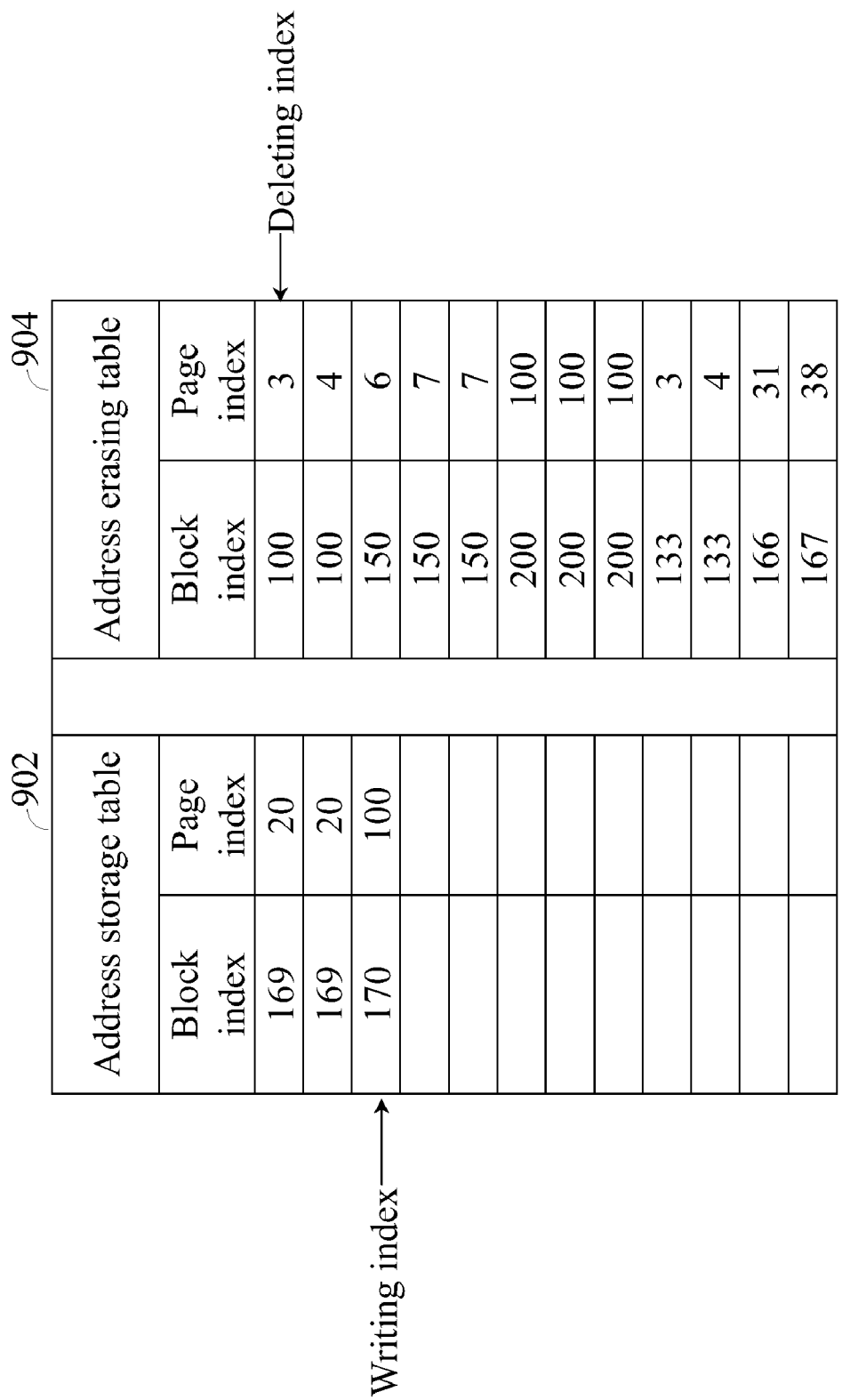
FIG. 9B is a schematic diagram of an embodiment of a subsequent stage of the address storage table shown in FIG. 9A according to the invention.

Referring to FIG. 9A, a schematic diagram of an embodiment of an address storage table 902 according to the invention is shown. The random access memory 216 stores the address storage table 902 as a reference of the controller 212 for storing addresses received from the host 202. In one embodiment, the address comprises a block index and a page index. The address storage table 902 has a writing index for indicating a last written address. In one embodiment, the random accesses memory 216 further stores an address erasing table 904. When the controller 212 starts to integrate a target block pair to reduce a total number of block pairs stored in the flash memory 214, the controller 212 moves a plurality of addresses stored in the address storage table 902 to the address erasing table 904, as shown in FIG. 9B. The address erasing table 904 has a deleting index to indicate a current deleted address. Accordingly, the controller 212 can sequentially move the deleting index to determine a block corresponding to the address pointed by the deleting index to be a target for creating a new block pair. After the addresses stored in the address storage table 902 are moved to the address erasing table 904, the addresses are erased from the address storage table 902 to allocate space to store new addresses received from the host 202.

Because the address storage table is stored in the random access memory 216, a system designer of the data storage device 204 must estimate the maximum memory space that may be occupied by the address storage table. First, when the data amount stored in a block is increased, the controller 212 may require a time period longer than more than three times that of the processing period $T_{prog}$ of a write command to complete integration of block pair data. Assume that a flash memory 214 comprises K blocks, the controller 212 requires N times that of a write command processing period $T_{prog}$ to complete integration of data of a block pair, and an address stored in an address storage table 220 occupies a memory space of M bytes. The address storage table 220 occupies at most a memory space of (N×K×M) bytes in the random access memory 216.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data writing method for a flash memory, wherein the data writing method comprises:
   receiving a write command, a write address, and write data from a host;
   determining whether a total number of block pairs in a flash memory is equal to a threshold value;
   determining whether execution of the write command increases the total number of block pairs;
   when the total number of block pairs is equal to the threshold value, and execution of the write command increases the total number of block pairs, writing the write data to a data buffer block of the flash memory, and storing the write address in an address storage table;
   selecting a target block pair for integration from the block pairs, wherein the target block pair comprises a target mother block and a target child block;
   when a plurality of subsequent write commands are received from the host, integrating the target mother block and the target child block into an integrated block during receiving intervals of subsequent write commands; and
   executing the write command according to the write data stored in the data buffer block and the write address stored in the address storage table.

2. The data writing method as claimed in claim 1, wherein integration of the target mother block and the target child block comprises:
   dividing data stored in the target mother block into a plurality of data segments;
   during each of the receiving intervals, combining one of the data segments with corresponding update data stored in the target child block to obtain an integrated data segment;
   writing the integrated data segments to a spare block as the integrated block; and
   erasing data from the target mother block and the target child block.

3. The data writing method as claimed in claim 2, wherein the target mother block comprises a plurality of pages, the data segments comprise a first data segment and a second data segment, the first data segment comprises data stored in pages with addresses in a former half of the target mother block, and the second data segment comprises data stored in pages with addresses in a later half of the target mother block.

4. The data writing method as claimed in claim 1, wherein the method further comprises:
   when the total number of block pairs is less than the threshold value, writing the write address into the flash memory according to the write address; and
   when the total number of block pairs is equal to the threshold value, and execution of the write command does not increase the total number of block pairs, writing the write address into the flash memory according to the write address.

5. The data writing method as claimed in claim 1, wherein each of the block pairs comprises a mother block and a child block, the mother block stores original data corresponding to a logical block address, and the child block stores updated data corresponding to the logical block address.

6. The data writing method as claimed in claim 1, wherein execution of the write command comprises:
   determining a specific block corresponding to the write address stored in the address storage table;
   obtaining a spare block as the child block corresponding to the specific block;
   writing the write data stored in the write buffer block to the spare block; and
   deleting the write address from the address storage table.

7. The data writing method as claimed in claim 6, wherein execution of the write command further comprises:
   searching the address storage table for at least one second write address corresponding to the specific block;
   reading at least one second write data corresponding to the second write address from the data buffer block;
   writing the second write data to the spare block according to the second write address; and
   deleting the second write address from the address storage table.

8. The data writing method as claimed in claim 1, wherein the address storage table is stored in a random access memory.

9. A data storage device, coupled to a host, comprising:
- a flash memory, comprising a data buffer block and a plurality of block pairs;
- a controller, receiving a write command, a write address, and write data from the host, determining whether a total number of block pairs is equal to a threshold value, determining whether execution of the write command increases the total number of block pairs, writing the write data to the data buffer block and storing the write address in an address storage table when the total number of block pairs is equal to the threshold value and execution of the write command increases the total number of block pairs, selecting a target block pair comprising a target mother block and a target child block for integration from the block pairs, integrating the target mother block and the target child block into an integrated block during receiving intervals of a plurality of subsequent write commands when the subsequent write commands are received from the host, and executing the write command according to the write data stored in the data buffer block and the write address stored in the address storage table.

10. The data storage device as claimed in claim 9, wherein the controller divides data stored in the target mother block into a plurality of data segments, combines the data segments with corresponding update data stored in the target child block to obtain a plurality of integrated data segments during the receiving intervals, writes the integrated data segments to a spare block as the integrated block, and erases data from the target mother block and the target child block, thereby integrating the target mother block and the target child block into the integrated block.

11. The data storage device as claimed in claim 10, wherein the target mother block comprises a plurality of pages, the data segments comprise a first data segment and a second data segment, the first data segment comprises data stored in pages with addresses in a former half of the target mother block, and the second data segment comprises data stored in pages with addresses in a later half of the target mother block.

12. The data storage device as claimed in claim 9, wherein the controller further writes the write address into the flash memory according to the write address when the total number of block pairs is less than the threshold value, and writes the write address into the flash memory according to the write address when the total number of block pairs is equal to the threshold value and execution of the write command does not increase the total number of block pairs.

13. The data storage device as claimed in claim 9, wherein each of the block pairs comprises a mother block and a child block, the mother block stores original data corresponding to a logical block address, and the child block stores updated data corresponding to the logical block address.

14. The data storage device as claimed in claim 9, wherein the controller determines a specific block corresponding to the write address stored in the address storage table, obtains a spare block as the child block corresponding to the specific block, writes the write data stored in the write buffer block to the spare block, and deletes the write address from the address storage table, thereby executing the write command.

15. The data storage device as claimed in claim 14, wherein when the write command is executed, the controller further searches the address storage table for at least one second write address corresponding to the specific block, reads at least one second write data corresponding to the second write address from the data buffer block, writes the second write data to the spare block according to the second write address, and deletes the second write address from the address storage table.

16. The data storage device as claimed in claim 9, wherein the data storage device further comprises a random access memory for storing the address storage table.

17. The data storage device as claimed in claim 9, wherein the data storage device is a memory card.

* * * * *